(12) United States Patent
Tanaka

(10) Patent No.: US 8,776,943 B2
(45) Date of Patent: Jul. 15, 2014

(54) ELECTRIC POWER STEERING DEVICE

(75) Inventor: Eiji Tanaka, Kitakatsuragi-gun (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 13/997,317

(22) PCT Filed: Dec. 21, 2011

(86) PCT No.: PCT/JP2011/079615
§ 371 (c)(1),
(2), (4) Date: Jun. 24, 2013

(87) PCT Pub. No.: WO2012/086678
PCT Pub. Date: Jun. 28, 2012

(65) Prior Publication Data
US 2013/0270032 A1    Oct. 17, 2013

(30) Foreign Application Priority Data

Dec. 24, 2010    (JP) ................................ 2010-288510

(51) Int. Cl.
*B62D 5/04* (2006.01)

(52) U.S. Cl.
USPC ............ 180/444; 180/443; 180/158; 180/159

(58) Field of Classification Search
USPC ........................... 180/443, 444; 464/158, 159
See application file for complete search history.

(56) References Cited

U.S. PATENT DOCUMENTS

| 6,491,131 | B1 * | 12/2002 | Appleyard ................. | 180/444 |
|---|---|---|---|---|
| 6,708,796 | B2 | 3/2004 | Kinme et al. | |
| 6,725,964 | B2 | 4/2004 | Appleyard | |
| 6,900,564 | B2 * | 5/2005 | Kobayashi et al. ............. | 310/83 |
| 2002/0017420 | A1 * | 2/2002 | Kinme et al. ................. | 180/444 |
| 2002/0189892 | A1 * | 12/2002 | Appleyard ..................... | 180/444 |
| 2006/0169528 | A1 * | 8/2006 | Yuasa et al. ................... | 180/444 |
| 2007/0158131 | A1 * | 7/2007 | Iwasa et al. ................... | 180/444 |
| 2008/0236933 | A1 * | 10/2008 | Kurokawa ..................... | 180/444 |
| 2011/0017542 | A1 * | 1/2011 | Kim et al. ..................... | 180/444 |
| 2012/0061168 | A1 * | 3/2012 | Hamakita et al. ............. | 180/444 |

(Continued)

FOREIGN PATENT DOCUMENTS

| JP | A-8-207792 | 8/1996 |
|---|---|---|
| JP | A-11-198822 | 7/1999 |

(Continued)

OTHER PUBLICATIONS

International Search Report issued in International Patent Application No. PCT/JP2011/079615 dated Apr. 17, 2012.

*Primary Examiner* — Joseph M Rocca
*Assistant Examiner* — Gabriela C Craciun
(74) *Attorney, Agent, or Firm* — Oliff PLC

(57) ABSTRACT

An electric power steering device includes: a worm shaft including a first end portion and a second end portion; a worm wheel; a joint; and an urging member. The first end portion includes: a first tubular portion; a diameter enlargement permission portion to allow enlargement of a diameter of the first tubular portion; and an external teeth portion. The joint includes: a second tubular portion; and an internal teeth portion capable of engaging the external teeth portion. The electric power steering device further includes a diameter enlargement member which is arranged in the first tubular portion and which enlarges a part of the first tubular portion in an axial direction thereof to press the internal teeth portion toward the external teeth portion.

5 Claims, 7 Drawing Sheets

(56) References Cited

U.S. PATENT DOCUMENTS

2012/0111657 A1* 5/2012 Hamakita et al. .............. 180/444
2013/0075189 A1* 3/2013 Sekikawa et al. ............ 180/444
2013/0133974 A1* 5/2013 Hamakita et al. .............. 180/444

FOREIGN PATENT DOCUMENTS

| | | |
|---|---|---|
| JP | A-2002-21943 | 1/2002 |
| JP | A-2002-266987 | 9/2002 |
| JP | A-2005-1545 | 1/2005 |

* cited by examiner

US 8,776,943 B2

ELECTRIC POWER STEERING DEVICE

TECHNICAL FIELD

The present invention relates to an electric power steering device.

BACKGROUND ART

In an electric power steering device in which an output of an electric motor is transmitted to a steering turning mechanism through a reduction gear mechanism, a worm reduction gear mechanism may be sometimes used as the reduction gear mechanism (for instance, see Patent Document 1).

In a structure disclosed in Patent Document 1, an output shaft of the electric motor is connected to a worm shaft by a spline joint. Specifically, a female spline formed in the output shaft of the electric motor is fitted to a male spline formed in one end portion of the worm shaft.

RELATED ART DOCUMENTS

Patent Documents

Patent Document 1: JP-A-2002-266987

SUMMARY OF THE INVENTION

Problem to be Solved by the Invention

In the structure disclosed in Patent Document 1, the male spline is formed in the shape of a spherical surface and a diameter of a central portion in the axial direction of the male spline is formed to be the largest. Thus, the male spline can swing on the central portion of the male spline as a supporting point relative to the female spline. Further, to the other end portion of the worm shaft, an urging force is applied by using a screw member. Thus, the worm shaft is pressed to a worm wheel side, so that a backlash in an engaged portion between the worm shaft and the worm wheel is cut down. As a result, an engagement noise caused by the backlash in the engaged portion of the worm shaft and the worm wheel is suppressed. However, since the backlash (clearance) ordinarily arises between the male spline and the female spline of the spline joint, a backlash sound (a rattling sound) resulting from the backlash is generated between the male spline and the female spline.

On the other hand, a joint having an elastic member is supposed to be used as a joint so that the backlash sound in the joint may be restrained from being generated. Such a joint includes, for instance, an input member fixed to an output shaft of an electric motor, an output member fixed to one end portion of a worm shaft and an elastic member arranged between the input member and the output member.

The input member and the output member include opposed surfaces opposed to each other. On the opposed surfaces respectively, a plurality of protruding portions are formed which protrude in the axial direction of the worm shaft. The protruding portions of the input shaft and the protruding portions of the output shaft are respectively arranged at intervals or with spaces left between them in the circumferential direction. The elastic members are interposed in the intervals or the spaces. In accordance with this structure, torque of the input member is transmitted in order to the protruding portions of the input member, the elastic members and the protruding portions of the output member, and transmitted to the worm shaft. In such a way, since the elastic members are interposed in a torque transmitting path, the backlash sound in the joint can be suppressed. However, in this structure, when the electric motor is started to be driven, the torque is transmitted to the output member from the input member after the elastic members are elastically compressed between the input member and the output member. Accordingly, a delay occurs until the torque is transmitted to a steering shaft after the start of driving of the electric motor. Therefore, responsiveness to a start of an assist in a steering operation is deteriorated for a start of a steering operation of a steering member.

The present invention is made in view of the above-described circumstances, and an object thereof is to provide an electric power steering device which can restrain a backlash sound from being generated in any of a joint and a worm reduction gear mechanism and transmit an output of an electric motor to the worm gear reduction mechanism without a delay.

Means for Solving the Problem

In order to achieve the above-described object, one exemplary aspect of the present invention provides an electric power steering device (1) including: a worm shaft (20) including a first end portion (22) and a second end portion (23); a worm wheel (21) which engages the worm shaft and which is connected to a steering turning mechanism (29); a joint (30) which connects the first end portion to an output shaft (18b) of an electric motor (18) so as to transmit torque; and an urging member (45) which elastically urges the second end portion in a direction in which a distance (K1) between centers of the worm shaft and the worm wheel is shortened, wherein the first end portion includes: a first tubular portion (34); a diameter enlargement permission portion (40) formed in the first tubular portion to allow enlargement of a diameter of the first tubular portion; and an external teeth portion (41) formed in an outer periphery of the first tubular portion, wherein the joint includes: a second tubular portion (46) which is rotatable integrally with the output shaft; and an internal teeth portion (49) which is formed in an inner periphery of the second tubular portion (46) and which is capable of engaging the external teeth portion, and wherein the electric power steering device further includes a diameter enlargement member (42; 55) which is arranged in the first tubular portion and which enlarges a part of the first tubular portion in an axial direction thereof to press the internal teeth portion toward the external teeth portion.

According to the present invention, the external teeth portions of the worm shaft and the internal teeth portions of the joint are mutually pressed by the diameter enlargement member. Thus, a clearance between the external teeth portions and the internal teeth portions can be shortened. Accordingly, when the electric motor is driven, an occurrence of a backlash sound (a rattling sound) from the joint can be suppressed. Further, since the diameter of the first tubular portion is partially enlarged by the diameter enlargement member, the external teeth portions are partially engaged with the internal teeth portions with respect to the axial direction of the worm shaft. Thus, the worm shaft can be swung relative to the joint on the engaged portion of the external teeth portions and the internal teeth portions as a supporting point. Accordingly, the worm shaft receives an urging force of the elastic member and is displaced toward the worm wheel side, so that a backlash in an engagement area of the worm shaft and the worm wheel can be reduced. Thus, the backlash sound (the rattling sound) in a worm reduction gear mechanism including the worm shaft and the worm wheel can be also restrained from occurring. In addition thereto, since the external teeth portions of the worm shaft are directly engaged with the internal teeth portions of the worm wheel, a mutually rigid engagement is realized. Accordingly, a delay in the transmission of the torque is not generated from the internal teeth portions to the external teeth portions. An output of the electric motor can be transmitted to the worm reduction gear mechanism without a delay.

Further, in the above-described electric power steering device, the diameter enlargement member may include a ball (42) pressed into the diameter enlargement permission portion. In this case, the diameter of the diameter enlargement permission portion can be enlarged by a simple structure that the ball is pressed in to the diameter enlargement permission portion. Further, since the ball may be inserted into the first tubular portion without considering a direction relative to the first tubular portion, a pressing-in operation of the ball to the first tubular portion is easy.

Further, in the above-described electric power steering device, a receiving recessed portion (44) which receives the diameter enlargement member may be formed in an inner peripheral surface (40a) of the diameter enlargement permission portion. In this case, when the diameter enlargement member inserted into the diameter enlargement permission portion is arranged in the receiving recessed portion, the diameter enlargement member can be assuredly arranged in a desired position. Thus, a supporting point of a swinging operation of the worm shaft can be assuredly set to a desired position.

Further, the above-described electric power steering device may further include a receiving member (50) which is arranged in the second tubular portion to receive the diameter enlargement member. In this case, the diameter enlargement member inserted into the diameter enlargement permission portion can be restrained from unexpectedly moving in the diameter enlargement permission portion. Thus, a state can be assuredly maintained that the diameter of a desired portion of the first tubular portion enlarged.

Further, in the above-described electric power steering device, a slit (43) may be formed in the diameter enlargement permission portion. In this case, the diameter enlargement permission portion can be realized by a simple structure that the slits are formed in the first tubular portion.

In the above description, numerical characters in parentheses represent reference numerals of corresponding component elements in a below-described exemplary embodiment, however, it is to be understood that the scope of claims is not limited by the reference numerals.

MODE FOR CARRYING OUT THE INVENTION

Figure 1:
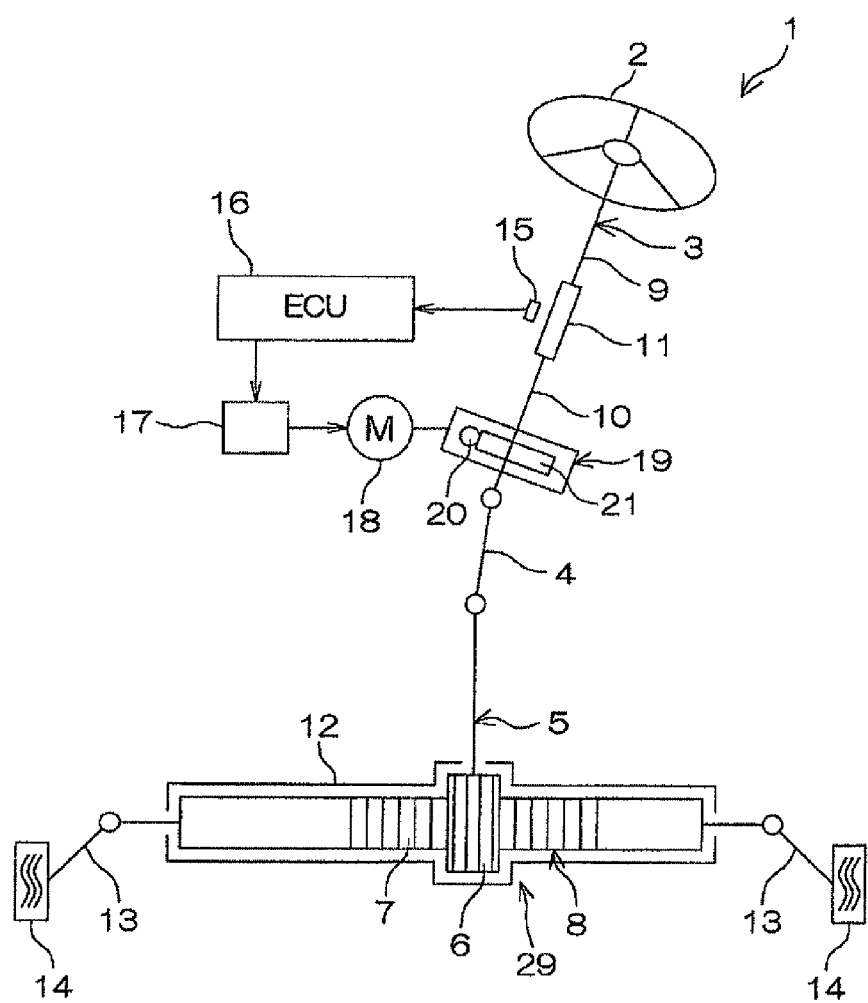
FIG. 1 is a schematic view showing a schematic structure of an electric power steering device according to one exemplary embodiment of the present invention.

Now, by referring to the drawings, an exemplary embodiment of the present invention will be specifically described below.

FIG. 1 is a schematic view showing a schematic structure of an electric power steering device 1 according to one exemplary embodiment of the present invention. Referring to FIG. 1, the electric power steering device 1 includes a steering shaft 3 connected to a steering member 2 such as a steering wheel, a pinion shaft 5 connected to the steering shaft 3 through an intermediate shaft 4 and a rack shaft 8 as a steering turning shaft. The rack shaft 8 has a rack 7 engaged with a pinion 6 formed in the pinion shaft 5 and extends in the transverse direction of a motor vehicle. The pinion shaft 5 and the rack shaft 8 form a steering turning mechanism 29 having a rack and pinion mechanism.

The steering shaft 3 includes an input shaft 9 connected to the steering member 2 and an output shaft 10 connected to the intermediate shaft 4. The input shaft 9 and the output shaft 10 are connected to each other so as to be relatively rotate on the same axial line through a torsion bar 11.

The rack shaft 8 is supported on a housing 12 so as to linearly reciprocate through a plurality of bearings not shown in the drawing. Both end portions of the rack shaft 8 protrude outside the housing 12. The end portions of the rack shaft 8 are respectively connected to steering turning wheels 14 through tie rods 13 and knuckle arms (not shown in the drawing).

When the steering member 2 is rotated and operated, the steering shaft 3 is rotated. The rotation of the steering shaft 3 is converted into a linear reciprocating movement of the rack shaft 8 through the pinion 6 and the rack 7. Thus, the steering turning operation of the steering turning wheels 14 is achieved.

When a steering torque is inputted to the steering member 2, the torsion bar 11 is distorted. Thus, the input shaft 9 and the output shaft 10 are relatively rotated by a minute angle. The relative rotation and displacement is detected by a torque sensor 15 provided in the vicinity of the steering shaft 3. Thus, the torque acting on the steering member 2 is detected. An output signal of the torque sensor 15 is applied to an ECU 16 (Electronic Control Unit). The ECU 16 controls an electric motor 18 for supporting a steering operation to be driven through a driving circuit 17 in accordance with a torque value or a vehicle speed value given from a vehicle speed sensor not shown in the drawing.

An output of the electric motor 18 is transmitted to the output shaft 10 of the steering shaft 3 through a worm reduction gear mechanism 19. A force transmitted to the output shaft 10 is transmitted to the rack shaft 8 through the pinion shaft 5. Thus, the steering operation is supported.

The worm reduction gear mechanism 19 includes a worm shaft 20 as a driving gear rotated and driven by the electric motor 18 and a worm wheel 21 as a driven gear engaged with the worm shaft 20. The worm wheel 21 is connected to the steering turning mechanism 29 through the output shaft 10 of the steering shaft 3.

Figure 2:
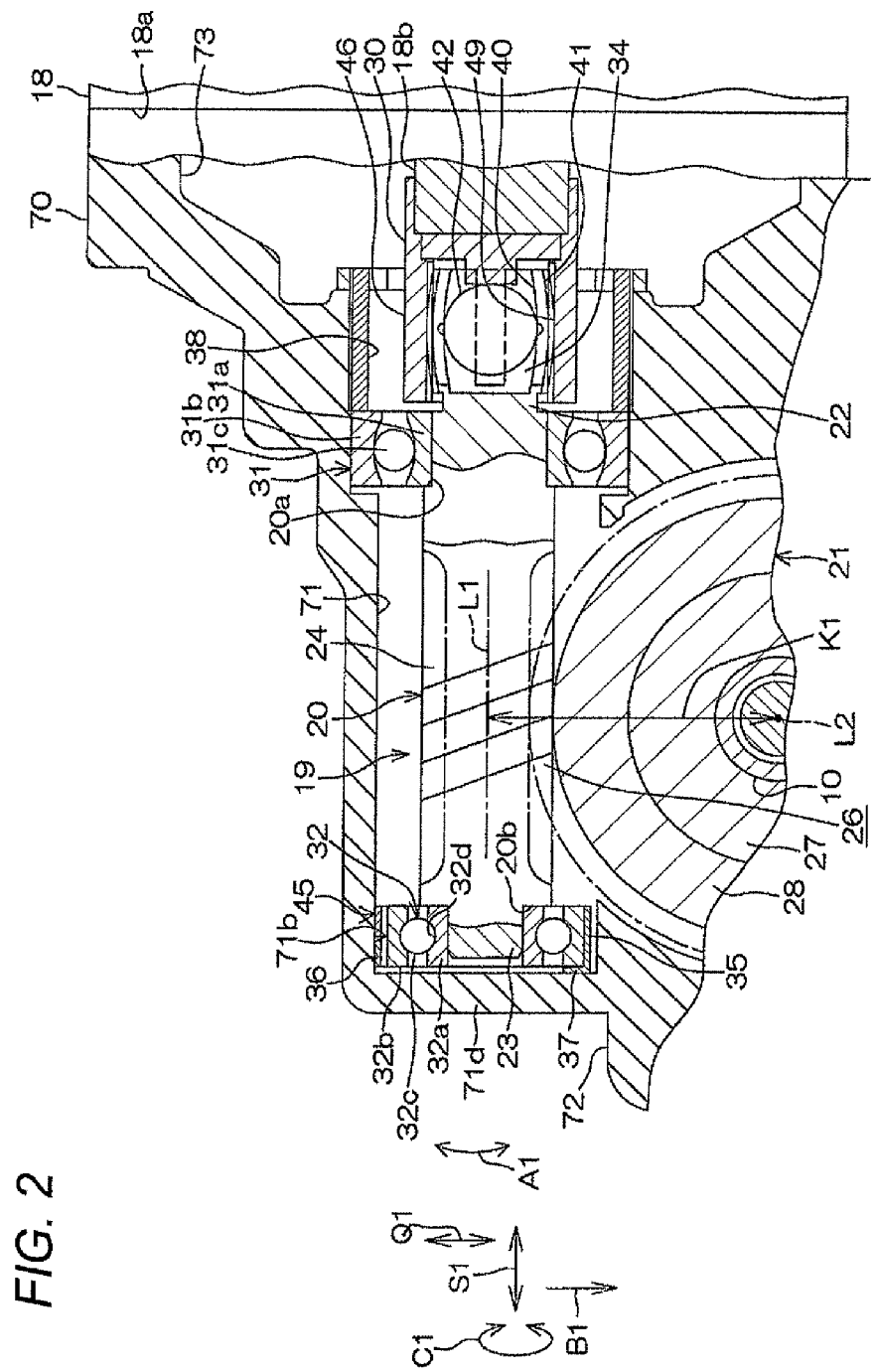
FIG. 2 is a sectional view showing a structure of an electric motor, a worm reduction gear mechanism and portions in the vicinity thereof.

FIG. 2 is a sectional view showing a structure of the electric motor 18, the worm reduction gear mechanism 19 and portions in the vicinity thereof. Referring to FIG. 2, the worm reduction gear mechanism 19 is accommodated in a housing 70. Further, the electric motor 18 is supported by the housing 70. The housing 70 includes a tubular driving gear accommodating housing 71 which accommodates the worm shaft 20 and a tubular driven gear accommodating housing 72 which accommodates the worm wheel 21. The housing 70 is integrally formed by using a metal material such as aluminum alloy.

In one end portion of the driving gear accommodating housing 71, an annular flange portion 73 is formed. To the annular flange portion 73, a motor housing 18a of the electric motor 18 is attached by using a fixing screw not shown in the drawing. The electric motor 18 includes the motor housing 18a and an output shaft 18b supported by the motor housing 18a so as to rotate. The output shaft 18b protrudes toward the driving gear accommodating housing 71 from the motor housing 18a. The output shaft 18b is connected to the worm shaft 20 through a joint 30 so as to transmit a power. The worm shaft 20 can be swung in a prescribed swinging direction A1 relative to the joint 30.

The worm shaft 20 includes a first end portion 22, a second end portion 23 and a columnar worm 24 arranged between the first end portion 22 and the second end portion 23 and having teeth portions.

The first end portion 22 is connected to the output shaft 18b of the electric motor 18 through the joint 30 so as to transmit the power (torque).

The worm wheel 21 includes an annular core bar 27 connected to the output shaft 10 so as to rotate integrally therewith and a synthetic resin member 28 which surrounds a periphery of the core bar 27 and has teeth formed in an outer periphery. The core bar 27 is inserted into a metal mold, for instance, when the synthetic resin member 28 is molded with a resin. The core bar 27 is fitted to the output shaft 10 of the steering shaft 3 by, for instance, a press-in work. Thus, the worm wheel 21 can rotate integrally with and cannot move in the axial direction of the output shaft 10.

In the first end portion 22 of the worm shaft 20, a first bearing 31 is arranged. Further, in the second end portion 23 of the worm shaft 20, a second bearing 32 is arranged. The first and second bearings 31 and 31 are, for instance, rolling bearings such as deep groove ball bearings. The worm shaft 20 is supported by the driving gear accommodating housing 71 of the housing 70 so as to rotate through the first bearing 31 and the second bearing 32.

The worm shaft 20 can be swung in the swinging direction A1 on the first end portion 22 as a center. Further, the second end portion 23 of the worm shaft 20 is elastically urged or energized in an urging direction B1 as a direction where a distance (an inter-center distance) K1 between a central axis L1 as a center of the worm shaft 20 and a central axis L2 as a center of the worm wheel 21 is shortened or narrowed. Thus, a backlash is restrained from occurring in an engagement area 26 of the worm 24 as a teeth forming portion of the worm shaft 20 and the worm wheel 21.

In a below-described explanation, an axial direction S1, a radial direction Q1 and a circumferential direction C1 of the worm shaft 20 are merely referred to as the axial direction S1, the radial direction Q1 and the circumferential direction C1 hereinafter.

Figure 3:
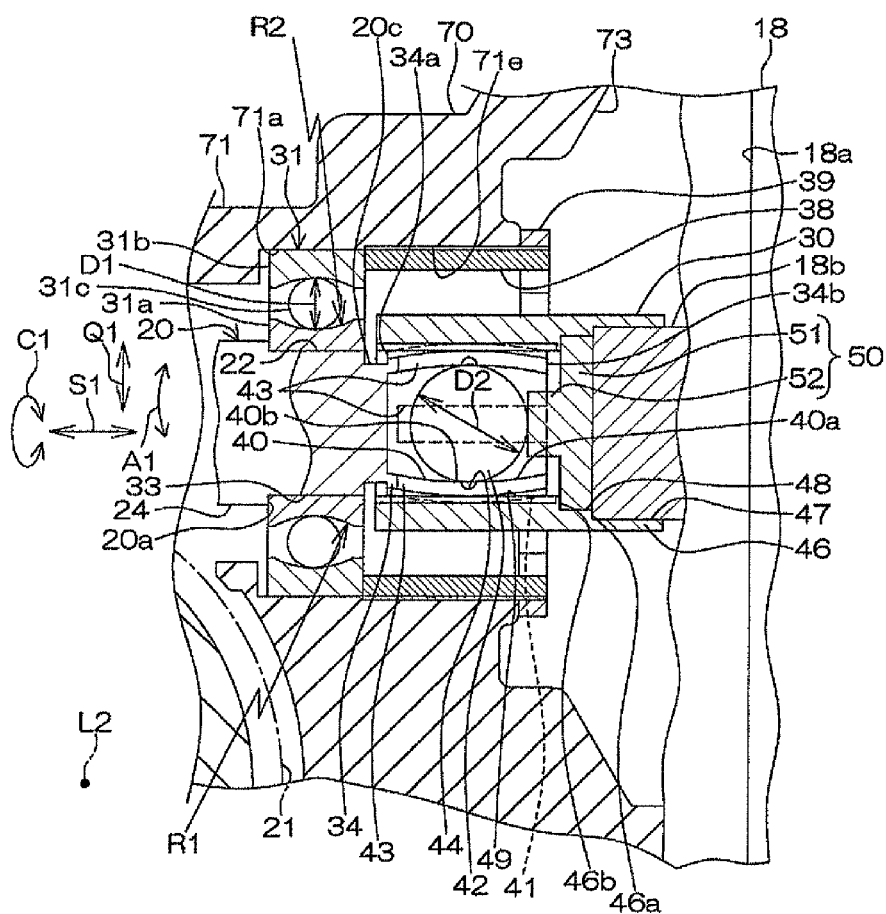
FIG. 3 is an enlarged view of a periphery of a first bearing in FIG. 2.

FIG. 3 is an enlarged view of a periphery of the first bearing 31 shown in FIG. 2. Referring to FIG. 3, the first end portion 22 includes a bearing holding portion 33 held by the first bearing 31 and a first tubular portion 34 continuous to the bearing holding portion 33. The bearing holding portion 33 is formed in a solid cylindrical shape.

The first bearing 31 supports the bearing holding portion 33 so that the worm shaft 20 may be swung in the swinging direction A1. The first bearing 31 includes an inner ring 31a, an outer ring 31b and a rolling element (a ball) 31c.

The inner ring 31a of the first bearing 31 is fitted to an outer periphery of the bearing holding portion 33. The inner ring 31a is pressed in and fixed to the first end portion 22 so that the inner ring 31a may move integrally with the worm shaft 20 in the axial direction S1.

The outer ring 31b of the first bearing 31 is supported by a bearing support portion (a holding hole) 71a of the driving gear accommodating portion 71. The first bearing support portion 71a is formed in an inner peripheral surface of the driving gear accommodating housing 71. The outer ring 31b is fitted to the first bearing support portion 71a by a loose fit so as to move in the axial direction relative to the housing 70.

The rolling element 31c of the first bearing 31 is interposed between a raceway track groove of an outer peripheral surface of the inner ring 31a and a raceway track groove of an inner peripheral surface of the outer ring 31b. The rolling element 31c of the first bearing 31 is formed with a ball having a prescribed diameter. In a cut surface (a cut surface shown in FIG. 3) including a central axis of the first bearing 31 and a center of the rolling element 31c, a radius of curvature R1 of the raceway track groove of the inner ring 31a is larger than 50% as large as a diameter D1 of the rolling element 31c. Further, a radius of curvature R2 of the raceway track groove of the outer ring 31b is larger than 50% as large as the diameter D1 of the rolling element 31c.

According to the above-described structure, the inner ring 31a of the first bearing 31 can be swung largely in the swinging direction A1 relative to the outer ring 31b. The swinging direction A1 is a direction including a clockwise direction and a counterclockwise direction on the first end portion 22 as a center when the worm shaft 20 is seen along the central axis L2 of the worm wheel 21.

Referring to FIG. 2, the second bearing 32 includes an inner ring 32a, an outer ring 32b and a rolling element 32c. The inner ring 32a of the second bearing 32 is fitted to an outer periphery of the second end portion 23. One end face of the inner ring 32a is born by an annular stepped portion 20b between the second end portion 23 and the worm 24.

The outer ring 32b of the second bearing 32 is supported by a second bearing support portion 71b formed in the inner peripheral surface of the driving gear accommodating housing 71 through an elastic member 45 as an urging member. The first bearing support portion 71b is formed in a slot long in the urging direction B1. Thus, the second bearing 32 and the second end portion 23 can move in the swinging direction A1.

The elastic member 45 is a leaf spring member formed by press working a belt shaped metal piece. The elastic member 45 includes an annular main body portion 35 with an end and an elastic tongue piece 36 extended form the main body portion 35. The main body portion 35 is fitted to an outer peripheral surface of the outer ring 32b of the second bearing 32. The elastic tongue piece 36 contacts the second bearing support portion 71b and is elastically compressed. By using an elastic repulsion force due to the elastic compression, the elastic member 45 urges the second end portion 23 of the worm shaft 20 in the urging direction B1 through the second bearing 32.

The urging direction B1 is a direction toward the worm wheel 21 from the worm shaft 20 (the inter-center distance K1 is shortened or narrowed) when the worm reduction gear mechanism 19 is seen along the axial direction S1 of the worm wheel 21.

In such a way, the worm shaft 20 is elastically urged on the first end portion 22 as the center so that the inter-center distance K1 between the centers of the worm shaft 20 and the worm wheel 21 is shortened. As a result, the backlash is maintained to be zero in the engagement area 26 of the worm 24 of the worm shaft 20 and the worm wheel 21.

An elastic protrusion 37 is extended from the main body portion 35 of the elastic member 45. The elastic protrusion 37 is supported by an end wall 71d of the driving gear accommodating housing 71 to elastically urge the second bearing 32 toward the first bearing 31 side.

An urging force of the elastic protrusion 37 is transmitted to the worm shaft 20 through the outer ring 32b, the rolling element 32c and the inner ring 32a of the second bearing 32. The urging force transmitted to the worm shaft 20 is received by a screw member 38 fixed to the driving gear accommodating housing 71 through the inner ring 31a, the rolling element 31c and the outer ring 31b of the first bearing 31. Thus, a pre-load is applied to the first and second bearings 31 and 32, so that a backlash sound caused by inner clearances of the first and second bearings 31 and 32 is restrained from occurring.

Referring to FIG. 3, the screw member 38 is screwed and connected to an internal thread portion 71e formed adjacently to the first bearing support portion 71a of the driving gear accommodating housing 71 to receive one end face of the outer ring 31b of the first bearing 31. The screw member 38 is locked by a lock nut 39 screwed and connected to the screw member 38.

Now, a connecting structure of the first end portion 22 of the worm shaft 20 and the joint 30 will be described below. In the one end portion 22 of the worm shaft 20, an annular groove portion 20c is formed between the bearing holding portion 33 and the first tubular portion 34. The annular groove portion 20c is provided to prevent the worm shaft 20 from contacting the joint 30 when the worm shaft 20 is swung in the swinging direction A1 relative to the joint 30.

The first tubular portion 34 is formed in a cylindrical shape. More specifically, the first tubular portion 34 is formed in the shape of a hollow barrel. Namely, the first tubular portion 34 is formed in a configuration that a diameter in a base end 34a side and an end 34b side is small and a diameter of a central portion 34c is large with respect to the axial direction S1. The central portion 34c is formed substantially in a spherical shape.

In the present exemplary embodiment, the first tubular portion 34 is formed integrally with the bearing holding portion 33 by using a single material. The first tubular portion 34 and the bearing holding portion 33 may be formed with different members and the bearing holding portion 33 and the first tubular portion 34 may be fixed to each other by welding.

The base end 34a of the first tubular portion 34 is continuous to the bearing holding portion 33. The end 34b of the first tubular portion 34 is opened to an external portion. The first tubular portion 34 includes a diameter enlargement permission portion 40 and an external teeth portion 41. In the diameter enlargement permission portion 40, a ball 42 as a diameter enlargement member is accommodated.

The diameter enlargement permission portion 40 is formed in at least a part of the first tubular portion 34 including the end 34b. The ball 42 is inserted therein, so that a diameter can be enlarged in the radial direction Q1. In the present exemplary embodiment, the diameter enlargement permission portion 40 is formed substantially in an entire area of the first tubular portion 34 with respect to the axial direction S1.

Figure 4:
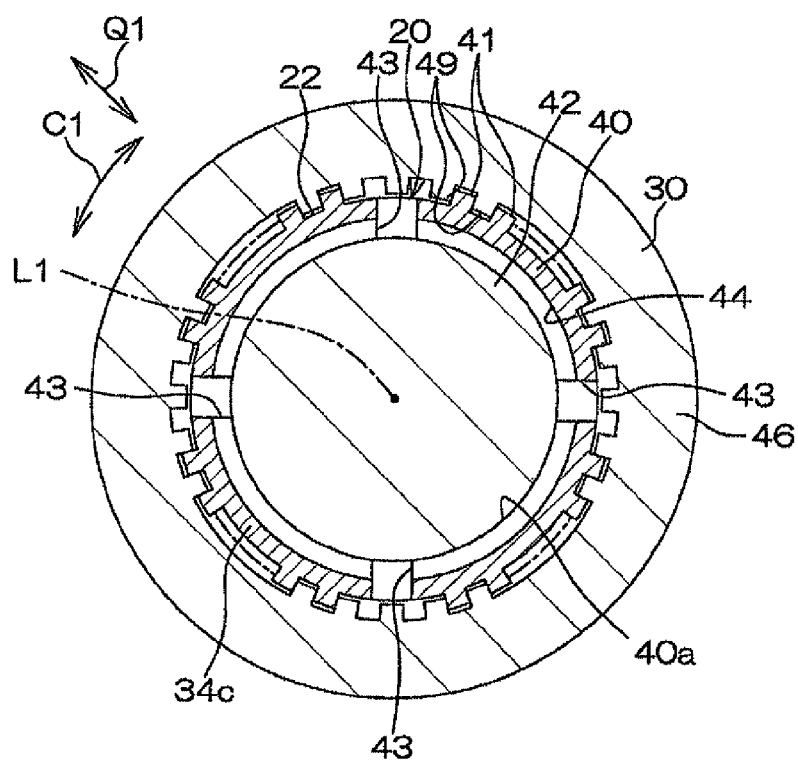
FIG. 4 is a sectional view showing main portions of a first end portion of a worm and in the vicinity thereof along an axial direction.

FIG. 4 is a sectional view showing main portions in the periphery of the first end portion 22 of the worm 20 along the axial direction S1. Referring to FIG. 3 and FIG. 4, in the diameter enlargement permission portion 40, slits 43 are formed to increase an elasticity of the diameter enlargement permission portion 40. The slits 43 pass through a thickness of the diameter enlargement permission portion 40 in the radial direction Q1. The plurality of slits 43 are formed at equal intervals in the circumferential direction C1.

In the present exemplary embodiment, the four slits 43 are formed. A groove width (a length in the circumferential direction C1) of each slit 43 is set to half a diameter D2 of the ball 42 or smaller to restrain a rigidity of the diameter enlargement permission portion 40 from being excessively lowered due to the provision of the slits 43. The slits 43 are respectively opened to the end 34b of the first tubular portion 34.

The external teeth portion 41 is formed on an outer peripheral surface of the first tubular portion 34. The external teeth portion 41 is formed on at least the outer peripheral surface of the diameter enlargement permission portion 40 and extended along a longitudinal direction (the axial direction S1) of the first tubular portion 34. The external teeth portion 41 is, for instance, external serration teeth. Many external teeth portions 41 are provided so as to surround the ball 42.

The ball 42 is formed by using a steel ball and substantially has a single radius of curvature. The ball 42 is pressed in and fixed to the diameter enlargement permission portion 40. The diameter D2 of the ball 42 is larger than an inside diameter (corresponding to an inside diameter of the base end 34a of the first tubular portion 34 in FIG. 3) of an inner peripheral surface 40a of the diameter enlargement permission portion 40 before the ball 42 is pressed in. Thus, the diameter of the diameter enlargement permission portion 40 (the central portion 34c) is enlarged by the ball 42. In the diameter enlargement permission portion 40, a receiving recessed portion 44 is formed. The receiving recessed portion 44 serves to receive the ball 42 so as to position the ball 42.

The receiving recessed portion 44 is formed as a recess on the inner peripheral surface 40a of the diameter enlargement permission portion 40. The receiving recessed portion 44 is arranged substantially in the center of the diameter enlargement permission portion 40 with respect to the axial direction S1, namely, in the central portion 34c of the first tubular portion 34. The receiving recessed portion 44 is formed in an annular shape along the circumferential direction C1 in the inner peripheral surface 40a of the diameter enlargement permission portion 40. The receiving recessed portion 44 has a length in the axial direction S1 set to, for instance, a length smaller than ¼ times as long as the diameter D2 of the ball 42, and line-contact the ball 42 at two positions. In accordance with the above-described structure, the central portion 34c in the diameter enlargement permission portion 40 (a part of the diameter enlargement permission portion 40) in which the receiving recessed portion 44 is provided is set to the largest portion of an outside diameter of the diameter enlargement permission portion 40. More specifically, the central portion 34c of the first tubular portion 34 bulges to have a shape including a part of the ball. The slits 43 are formed in both sides of the receiving recessed portion 44 with respect to the axial direction S1.

Referring to FIG. 3, the joint 30 includes a second tubular portion 46. The second tubular portion 46 is formed in a cylindrical shape and extended toward the first tubular portion 34 from the output shaft 18b of the electric motor 18. In an inner peripheral surface of the second tubular portion 46, a first connecting portion 47, a second connecting portion 48 and an internal teeth portion 49 are provided. The first connecting portion 47, the second connecting portion 48 and the internal teeth portion 49 are arranged in order with respect to the axial direction S1. Further, inside diameters of the first connecting portion 47, the second connecting portion 48 and the internal teeth portion 49 are larger in order.

The first connecting portion 47 is pressed in and fixed to the output shaft 18b of the electric motor 18. Thus, the second tubular portion 46 is connected to the output shaft 18b so as to integrally rotate. An annular stepped portion 46a between the first connecting portion 47 and the second connecting portion 48 bears an end face of the output shaft 18b. Thus, the joint 30 is positioned relative e to the output shaft 18b.

To the second connecting portion 48, a below-described receiving member 50 is connected. Many internal teeth portions 49 are formed in an entire area of the circumferential direction C1 in the inner peripheral surface of the second tubular portion 26. The internal teeth portions 49 are, for instance, internal serrations. The internal teeth portions 49 are extended in parallel with the axial direction S1 so that the internal teeth portions 49 may be engaged with the external teeth portions 41 so as to transmit torque. More specifically, the ball 42 presses the diameter enlargement permission portion 40 outward in the radial direction Q1 to enlarge the diameter of the central portion 34c of the first tubular portion 34. Thus, the external teeth portions 41 formed in the central portion 34c are engaged with the internal teeth portions 49 and pressed by the internal teeth portions 49.

Since the central portion 34c is formed in the spherical shape, a part of the external teeth portion 41 substantially forms a spherical serration. Thus, the external teeth portions 41 and the internal teeth portions 49 are partially engaged with each other with respect to the axial direction S1. Further, a clearance between the external teeth portions 41 and the internal teeth portions 49 is shortened, so that a backlash is restrained from occurring between both the teeth portions. Namely, the external teeth portions 41 are fitted to the internal teeth portions 49 with interference. The value of the interference can be easily set to a desired value by suitably setting the diameter D2 of the ball 42.

In accordance with the above-described structure, the external teeth portions 41 contact the internal teeth portions 49 under a state near a line contact. Thus, the worm shaft 20 can be swung in the swinging direction A1 on the center of the ball 42 as a central portion.

In the second tubular portion 46, the receiving member 50 is arranged. The receiving member 50 is provided to assuredly push in the ball 42 to the receiving recessed portion 44 and restrain the ball 42 from slipping out from the first tubular portion 34. The receiving member 50 includes a receiving member main body 51 fixed to the second connecting portion 48 of the second tubular portion 46 and a protruding portion 52 protruding from the receiving member main body 51.

The receiving member main body 51 is born by an annular stepped portion 46b between the second connecting portion 48 and the internal teeth portion 49. Thus, the receiving member 50 is positioned with respect to the axial direction S1. The protruding portion 52 protrudes toward the first tubular portion 34 from the receiving member main body 51. The protruding portion 52 passes through the end 34b of the first tubular portion 34 and enters the first tubular portion 34. An end face of the protruding portion 52 is flat to bear the ball 42.

The general structure of the electric power steering device 1 is described above. Now, main points of a production of the electric power steering device 1 will be described below.

Figure 5:
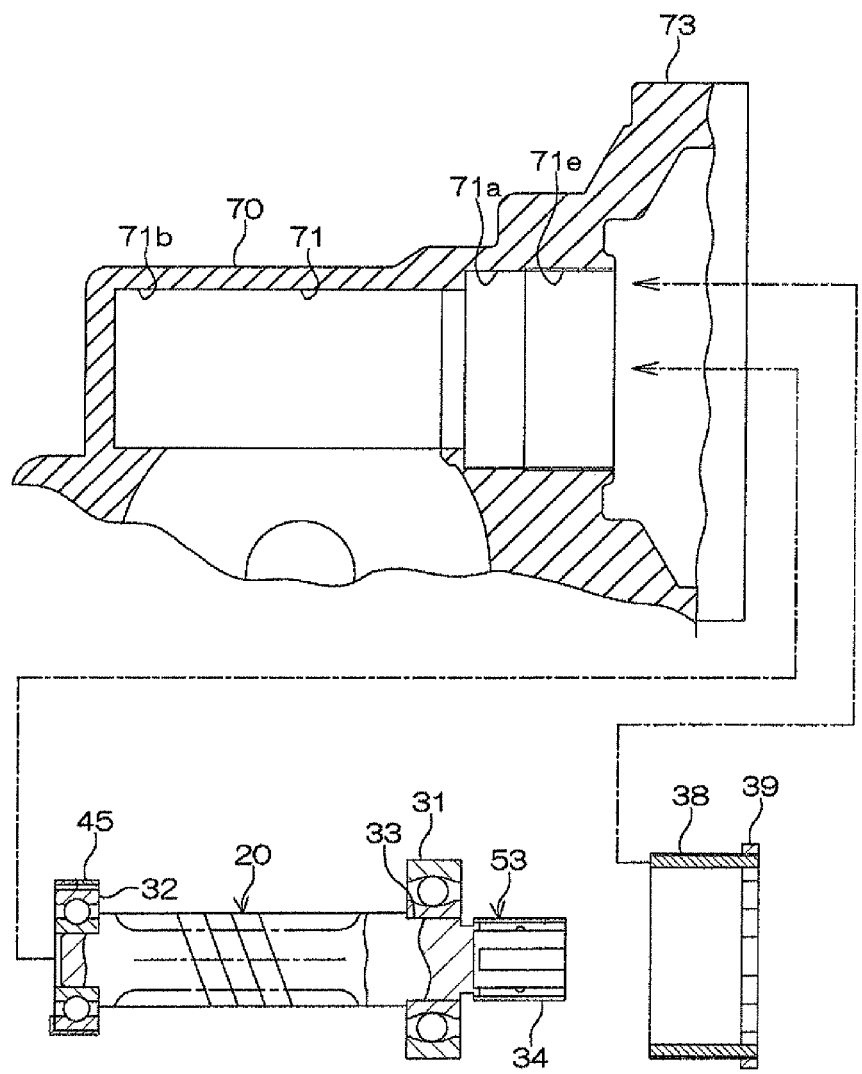
FIG. 5 is a sectional view of main portions for explaining an operation for attaching a worm shaft to an output shaft of an electric motor.

When the worm shaft 20 is attached to the output shaft 18b of the electric motor 18, initially, a subassembly 53 is prepared as shown in FIG. 5. The subassembly 53 has a structure that the first and second bearings 31 and 32 are attached to the worm shaft 20, and further, the elastic member 45 is attached to the second bearing 32. At this time, the first tubular portion 34 of the worm shaft 20 is formed in the cylindrical shape and has the same diameter in any position in the axial direction S1. At this time, an outside diameter of the first tubular portion 34 is set to be smaller than a diameter of the bearing holding portion 33 so that the first bearing 31 may be attached to the bearing holding portion 33. The subassembly 53 is inserted into the housing 70 from the annular flange portion 73 side of the housing 70 to attach the subassembly 53 to the driving gear accommodating housing 71. Then, the screw member 38 and the lock nut 39 are attached to the housing 70.

Figure 6A:
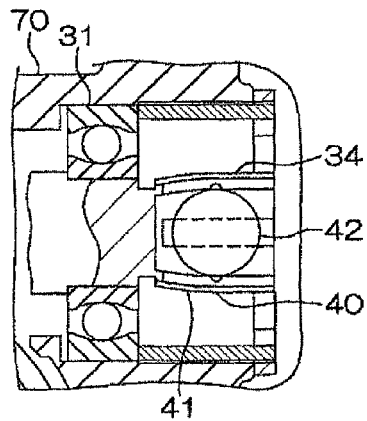
FIGS. 6(A) to 6(C) are sectional views of main portions for explaining operations for attaching the worm shaft to the output shaft of the electric motor.
Figure 6B:
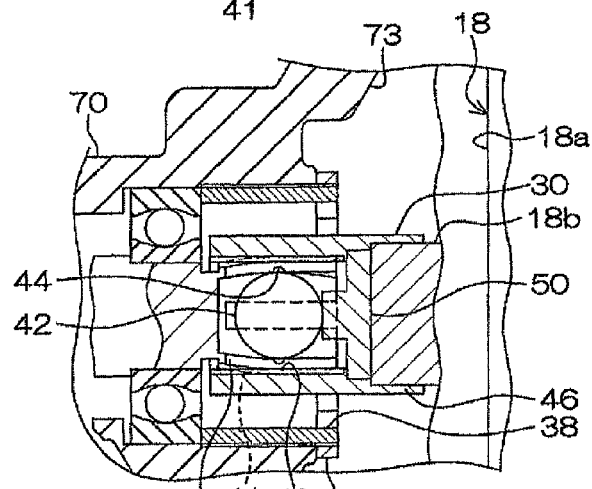

Then, as shown in FIG. 6(A), the ball 42 is pressed in to the diameter enlargement permission portion 40 of the first tubular portion 34. Thus, the position of the diameter enlargement permission portion 40 where the ball 42 passes is enlarged. As a result, the first tubular portion 34 has a shape of a flared cup. Then, as shown in FIG. 6(B), the receiving member 50 and the joint 30 fix the electric motor 18 fixed to the output shaft 18b to the annular flange portion 73 of the housing 70. At this time, the second tubular portion 46 of the joint 30 is fitted to the first tubular portion 34. The internal teeth portions 49 of the joint 30 are engaged with the external teeth portions 41 of the first tubular portion 34. Further, the receiving member 50 assuredly pushes in the ball 42 to the first tubular portion 34 and allows the ball 42 to contact the receiving recessed portion 44.

Figure 6C:
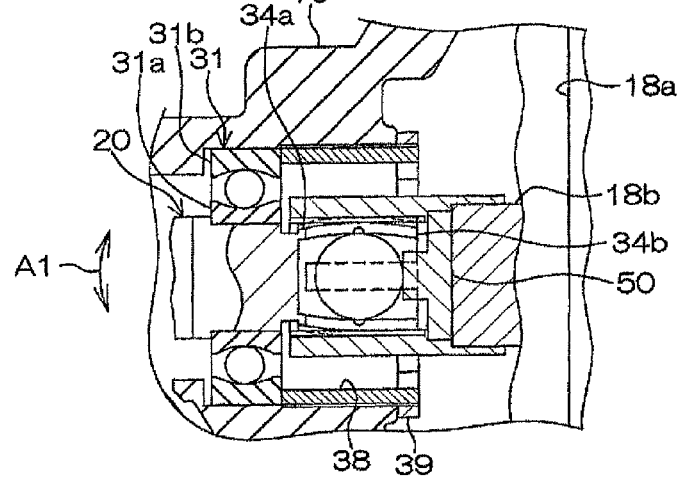

Then, as shown in FIG. 6(C), the worm shaft 20 is displaced in one swinging direction A1 by using a jig now shown in the drawing. Under this state, when the worm shaft 20 is rotated, a periphery of the end 34b of the first tubular portion 34 is sequentially plastically deformed along the circumferential direction C1. As a result, the first tubular portion 34 is formed in the shape of the barrel. Thus, the external teeth portions 41 in the central portion 34c of the first tubular portion 34 are fitted to the internal teeth portions 49 substantially under a state that the external teeth portions 41 line-contact the internal teeth portions 49.

As described above, according to the present exemplary embodiment, the external teeth portions 41 of the worm shaft 20 and the internal teeth portions 49 of the joint 30 are mutually elastically pressed by the ball 42. Thus, the clearance between the external teeth portions 41 and the internal teeth portions 49 can be shortened. Accordingly, when the electric motor 18 is driven, an occurrence of a backlash sound (a rattling sound) from the joint 30 can be suppressed.

Further, since the diameter of the first tubular portion 34 is partially enlarged by the ball 42, the external teeth portions 41 are partially engaged with the internal teeth portions 49 with respect to the axial direction S1. Thus, the worm shaft 20 can be swung relative to the joint 30 on the engaged portion of the external teeth portions 41 and the internal teeth portions 49 as a supporting point. Accordingly, the worm shaft 20 receives the urging force of the elastic member 45 and is displaced toward the worm wheel 21 side, so that the backlash in the engagement area 26 of the worm shaft 20 and the worm wheel 21 can be reduced. Thus, the backlash sound (the rattling sound) in the worm reduction gear mechanism 19 can be also restrained from occurring.

In addition thereto, since the external teeth portions 41 of the worm shaft 20 are directly engaged with the internal teeth portions 49 of the worm wheel 21, a mutually rigid engagement is realized. Accordingly, a delay in the transmission of the torque is not generated from the internal teeth portions 49 to the external teeth portions 41. An output of the electric motor 18 can be transmitted to the worm reduction gear mechanism 19 without a delay.

Further, the diameter of the diameter enlargement permission portion 40 can be enlarged by a simple structure that the ball 42 is pressed in to the diameter enlargement permission portion 40. Further, since the ball 42 may be inserted into the first tubular portion 34 without considering a direction relative to the first tubular portion 34, a pressing-in operation of the ball 42 to the first tubular portion 34 is easy.

Further, since the ball 42 inserted into the diameter enlargement permission portion 40 is arranged in the receiving recessed portion 44, the ball 42 can be assuredly arranged in a desired position. Thus, a supporting point of the swinging operation of the worm shaft 20 can be assuredly set to a desired position.

Further, since the receiving member 50 is provided, the ball 42 inserted into the diameter enlargement permission portion 40 can be restrained from unexpectedly moving in the diameter enlargement permission portion 40. Thus, a state can be assuredly maintained that the diameter of a desired portion (the central portion 34c) of the first tubular portion 34 is enlarged.

Further, the diameter enlargement permission portion 40 can be realized by a simple structure that the slits 43 are formed in the first tubular portion 34.

Figure 7:
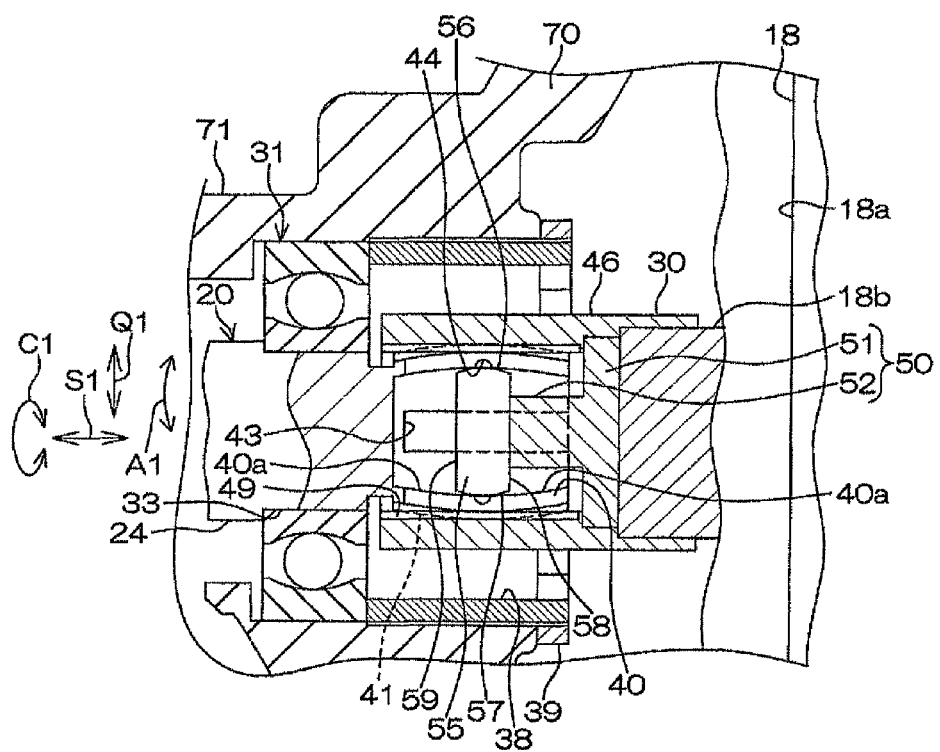
FIG. 7 is a sectional view of main portions of another exemplary embodiment of the present invention.

The present invention is not limited to contents of the above-described exemplary embodiment and various changes may be made within a range described in claims. For instance, as the diameter enlargement member, the ball 42 is used, however, the present invention is not limited thereto. The diameter enlargement member may be a member which can enlarge the diameter of the diameter enlargement permission portion 40 outward in the radial direction Q1 in the diameter enlargement permission portion 40. For instance, a diameter enlargement member 55 shown in FIG. 7 may be used in place of the ball 42. The diameter enlargement member 55 corresponds to a configuration obtained by cutting a part of the ball 42 and includes one pair of spherical portions 56 and 57 and one pair of side surfaces 58 and 59 which connect the spherical portions 56 and 57 together. The one pair of spherical portions 56 and 57 press an inner peripheral surface 40a of a diameter enlargement permission portion 40 of a first tubular portion 34 to enlarge a diameter of the diameter enlargement permission portion 40 of the first tubular portion 34. One side surface 58 is received by a receiving member 50.

Further, a connection of the external teeth portions 41 and the internal teeth portions 49 is not limited to a serration connection, and may be other kind of connection such as a spline connection. Further, the receiving member 50 may be removed. Further, the slits 43 of the diameter enlargement permission portion 40 pass through the thickness of the first tubular portion 34, however, the present invention is not limited thereto. Grooves may be formed on an inner peripheral surface or an outer peripheral surface of a first tubular portion 34 to form a diameter enlargement permission portion.

DESCRIPTION OF REFERENCE SIGNS

1: Electric Power Steering Device
18: Electric Motor
18b: Output Shaft
20: Worm Shaft
21: Worm Wheel
22: First End Portion
23: Second End Portion
29: Steering Turning Mechanism
30: Joint
34: First Tubular Portion
40: Diameter Enlargement Permission Portion
40a: Inner Peripheral Surface
41: External Teeth Portion
42: Ball (Diameter Enlargement Member)
43: Slit
44: Receiving Recessed Portion
45: Elastic Member (Urging Member)
46: Second Tubular Portion
49: Internal Teeth Portion
50: Receiving Member
55: Diameter Enlargement Member
K1: Inter-Center Distance

The invention claimed is:

1. An electric power steering device comprising:
a worm shaft comprising a first end portion and a second end portion;
a worm wheel which engages the worm shaft and which is connected to a steering turning mechanism;
a joint which connects the first end portion to an output shaft of an electric motor so as to transmit torque; and
an urging member which elastically urges the second end portion in a direction in which a distance between centers of the worm shaft and the worm wheel is shortened,
wherein the first end portion comprises:
a first tubular portion;
a diameter enlargement permission portion formed in the first tubular portion to allow enlargement of a diameter of the first tubular portion; and
an external teeth portion formed in an outer periphery of the first tubular portion,
wherein the joint comprises:
a second tubular portion which is rotatable integrally with the output shaft; and
an internal teeth portion which is formed in an inner periphery of the second tubular portion and which is capable of engaging the external teeth portion, and
wherein the electric power steering device further comprises a diameter enlargement member which is arranged in the first tubular portion and which enlarges a part of the first tubular portion in an axial direction thereof to press the internal teeth portion toward the external teeth portion.

2. The electric power steering device according to claim 1, wherein the diameter enlargement member comprises a ball pressed into the diameter enlargement permission portion.

3. The electric power steering device according to claim 1, wherein a receiving recessed portion which receives the diameter enlargement member is formed in an inner peripheral surface of the diameter enlargement permission portion.

4. The electric power steering device according to claim 1, further comprising:
a receiving member which is arranged in the second tubular portion to receive the diameter enlargement member.

5. The electric power steering device according to claim 1, wherein a slit is formed in the diameter enlargement permission portion.

* * * * *